United States Patent Office 3,250,743
Patented May 10, 1966

3,250,743
POLYMERIC SILICATES
Joseph Feltzin, West Covina, Calif., and Wolfram Spiess, Bad Durkheim, Pfalz, Germany, assignors to Aerojet-General Corporation, Azusa, Calif., a corporation of Ohio
No Drawing. Filed July 11, 1962, Ser. No. 209,226
20 Claims. (Cl. 260—46.5)

This invention relates to novel polymeric silicate compositions and a method for their manufacture.

With the advent of the space age, there has been a great need for polymeric materials which are thermally stable at high temperatures, for example, 500 to 1000° F. Numerous workers have been engaged in attempting to make such new materials and some high temperature resistant materials have resulted. There still exists a very real need, however, for additional materials since not one, but many new high temperature resistant materials are needed for this new field.

An object of this invention is to provide novel polymeric materials having particular applicability for use at high temperatures. A further object is to provide novel silicate polymeric materials which have very good high temperature properties. A still further object is to provide a method for making the aforesaid silicate polymeric materials.

The objects of our invention are accomplished by forming polymeric silicate materials according to the following generalized equation:

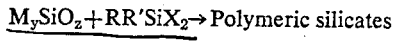

$$M_ySiO_z + RR'SiX_2 \rightarrow \text{Polymeric silicates}$$

In the above equation M is an alkali metal such as sodium, potassium or lithium. R and R' are lower alkyl radicals, lower alkaryl radicals, lower aralkyl radicals, or lower aryl radicals. Preferably, R and R' are methyl radicals since the products produced in this case have properties superior to others of our products which are superficially quite similar, e.g., when R and R' are both ethyl radicals. X in the above equation represents a halogen having an atomic weight greater than 35, i.e., chlorine, bromine, or iodine. Preferably, X is a chlorine since this was found to give superior products or, in the alternative, satisfactory products at a lower cost than obtainable when X was bromine or iodine. y is either 2 or 4 and z is either 3 or 4 with z always being equal to or greater in number than y. Thus, when y is 2, z is 3, and when y is 4, z is 4. Preferred reactants within this description are sodium orthosilicate, sodium metasilicate and mixtures of the two. By lower alkyl, lower aryl, lower aralkyl, and lower alkaryl, we mean those groups which contain up to about ten carbon atoms. This includes, for example, methyl, ethyl, propyl, heptyl, decyl, phenyl, tolyl, butylphenyl, phenylbutyl, benzyl, mesityl, and the like.

The above described reaction is carried out in the presence of a relatively non-oxidizing acid or mixture of acids having an ionization constant, pKa, in excess of $1.1 \times 10^{-2}$. That is to say, the acid or acid mixture employed must have an ionization constant greater than that of phosphoric acid and not be an oxidizing acid such as nitric acid, perchloric acid and the like. Essentially any organic acid can be employed which has an ionization constant in excess of $1.1 \times 10^{-2}$. Specific acids which were employed contain some water such as hydrochloric acid, sulphuric acid of 50 to 90% concentration (by weight), and trichloroacetic acid of 50 to 90% concentration (by weight). A further requirement of the acid medium is that it should not be less than about 50% by weight concentrated. That is to say, the acid in its concentrated commercially available form should not be mixed with more than an equal weight of water. It should be noted that concentrated HCl, for example, contains only 36% HCl by weight while concentrated $H_2SO_4$ is about 100% $H_2SO_4$ by weight.

When the silicate reactant, $M_ySiO_z$, contains water of hydration, we can employ, as the acid medium, acids which contain essentially no water such as concentrated sulfuric or pure trichloroacetic acid. In this instance, the water of hydration furnishes the necessary water for the reaction.

The reaction can be conducted at a temperature from about 50° C. up to but not including the decomposition temperature of the reactants. Preferably the reaction is conducted between about 70 to about 90° C. since optimum results were obtained in this range. When the reaction is performed at atmospheric pressure, a limiting consideration with regard to reaction temperature is the fact that the silane reactant, $RR'SiX_2$, evaporates from the reaction system at higher temperatures. When the reaction is conducted under pressure, this is, of course, not a limiting consideration. Normally the reaction is conducted at atmospheric pressure; however, the reaction can be conducted at much higher pressure—for example, up to a hundred atmospheres—if desired. It is necessary to agitate the reaction mixture since agitation is required in order to obtain reasonable product yields within a reasonable reaction time.

When the silane reactant $RR'SiX_2$ contains bromine or iodine as X, the acid HBr or HI is formed in the polymerization reaction. Since HBr and HI are oxidizing acids and therefore not desired in the reaction mixture, we then conduct the process under atmospheric or reduced pressures to facilitate removal of HI or HBr as a gas. This is not necessary when X is chlorine since HCl is not oxidizing acid and does not have to be removed from the reaction mixture.

The relative quantities of reactants employed in our process are critical. For each mole of silicate reactant, $M_ySiO_z$ (computed on a dry basis), there are employed from about 1 to about 15 moles of the silane reactant, $RR'SiX_2$. The properties of our products vary considerably depending upon the reactant ratio employed. Thus, in the case of reaction between sodium orthosilicate and dimethyldichlorosilane, a tacky soft rubber was obtained using 15 moles of the silane reactant for each mole of the silicate reactant. When using 5 moles of the silane reactant for each mole of the silicate reactant, there was obtained a plastic material. Using the reactants in a one to one molar ratio, a very stiff plastic mass was obtained. Optimum reactant ratios for producing a rubbery polymer were found to be in the range of about 2½ moles of the silane reactant for each mole of the silicate reactant. Since alkali metal orthosilicates and metasilicates contain a substantial amount of water of hydration (up to about 10 moles of water for each mole of the silicate), the water of hydration must be taken into consideration in determining the amount of silicate reactant to be employed in the reaction. In the case of sodium orthosilicate containing 10 moles of water for each mole of the orthosilicate, the number of moles of sodium orthosilicate reactant desired (computed in the dry state) is multiplied by 2 to give the equivalent number of moles of the sodium orthosilicate decahydrate to be employed.

The order of addition of the reactants in our process is not critical. However, when the alkali metal silicate reactant is added to relatively concentrated acid, considerable heat is evolved. Thus, we prefer to make this addition slowly so as to keep the reaction temperature within the desired limits. During the course of the polymerization reaction, a hydro halide acid is formed along with an alkali metal halide salt. Also, a slight exotherm is noted. The completeness of the reaction can be readily determined by carefully observing the reaction temperature to note when the reaction exotherm is completed. A further way to judge the progress of the reaction is to observe the evolution of the hydro halide acid from the reaction mixture. When hydro halide acid evolution ceases, this is an indication that the reaction is completed. Normally, we employ up to about six hours for the reaction although a longer time can be employed if desired.

After the reaction is completed, water may—although not necessary to do so—be added to the reaction mixture to free the reaction product from alkali metal halide. The quantity of water added is generally up to about twice that of the acid originally added to the reaction mixture. On addition of the water, most of the alkali metal halide formed in the reaction goes into solution. The product is readily separated from the reaction mixture as, for example, by decantation. Further purification of the decanted product can be obtained, for example, by washing it with water and subsequently drying it.

Our products are extremely complex in structure and we are not certain as to what their structure is. It is believed, however, that our product contains a number of substituted silylene groupings having the formula:

and a number of dihydroxy silylene groupings having the formula:

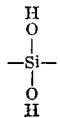

The various silylene groups (both those substituted with R groups and those substituted with hydroxy groups) are believed bonded together through siloxane linkages. Since our products vary considerably, depending upon the quantities of reactants employed, the above statements as to our products are, of necessity, only generalizations. Some of our products are hard plastics while others are polymeric liquids; thus, the degree of cross-linking is necessarily an important factor. Since we do not know precisely the degree of cross-linking in our products, the above explanation does not include any discussion of cross-linking between polymer chains.

In order to further illustrate the nature of our invention, there are presented the following examples in which all parts and percentages are by weight unless otherwise indicated.

*Example I*

Seventy grams of sodium orthosilicate decahydrate was dissolved in 250 cc. (cubic centimeters) of concentrated hydrochloric acid with stirring. There was then added 65 grams of dimethyldichlorosilane with stirring over a one-half hour period. During the addition, the reaction temperature was maintained between 70 to 90° C. After the addition was completed, stirring was continued for an additional one-half hour. The mixture was then diluted with water and the precipitate was separated from the dilute acid and washed with water until the washings were found to be neutral to litmus paper. The precipitated product was then washed with acetone and dried in vacuo overnight at room temperature. The plastic product was then subjected to 10,000 curies of gamma irradiation in a cobalt-60 source for sixty-five hours. This resulted in the curing of the plastic product to a rubber. The total yield of rubber was 36 grams or a 47.5% yield (based on weight of product obtained). On subjecting the product to infrared analysis, free hydroxyl groups were indicated by a strong absorption peak at 2.9 microns.

When Example I is repeated using lithium orthosilicate and potassium orthosilicate in place of sodium orthosilicate, the polymeric product is obtained in good yield. Also, when Example I is repeated employing dihexyldichlorosilane and diisobutyldichlorosilane in place of the dimethyldichlorosilane, polymeric products are obtained.

*Example II*

Sodium metasilicate pentahydrate (12.21 grams) was slowly added to a mixture of dimethyldichlorosilane (12.9 grams) in 85 cc. of concentrated hydrochloric acid with stirring. The reaction temperature rose from room temperature to about 90° C. The stirring was continued for one hour after the addition was completed. The acid solution was then decanted from the plastic precipitate and the precipitate was washed with water until the washings were neutral to litmus. The precipitate was then washed with acetone and dried in vacuo overnight at room temperature. The plastic product was cured to a hard rubber by two different methods. The first method involved subjecting the plastic product to gamma irradiation for sixty-five hours in a 10,000 curie cobalt-60 source. The second method of curing involved heating the plastic product for seventy-two hours at 260° C.

When Example II is repeated using lithium metasilicate and potassium metasilicate in place of sodium metasilicate, the polymeric product is similarly obtained. Likewise, substitution of ethylbenzlydichlorosilane and dibenzyldichlorosilane for dimethyldichlorosilane gives a polymeric product.

*Example III*

Seven grams of sodium orthosilicate decahydrate was added incrementally to 12.65 grams of diphenyldichlorosilane in 80 cc. of concentrated hydrochloric acid with stirring at room temperature. The addition took approximately fifteen minutes. After the addition was completed, the reaction temperature was raised to 120° C. and maintained at 120° C. for one-half hour. The reaction mixture was then cooled and the acid was then decanted from the sticky plastic product. The plastic was then washed with water until the washings were neutral. The plastic product is soluble in organic solvent such as acetone, carbon tetrachloride, etc. It was found that a continuous film could be cast by pouring into water a solution of the plastic product in acetone.

*Example IV*

When Example I was repeated using 95 grams of phenylmethyldichlorosilane in place of the 65 grams of dimethyldichlorosilane, a polymer was obtained which was a sticky semi-fluid.

When Example IV is repeated using diphenyldibromosilane and ethylphenyldichlorosilane in place of phenylmethyldichlorosilane, a polymeric product is obtained.

*Example V*

Sodium orthosilicate undecahydrate (0.0916 gram mole) was added to about 125 ml. (milliliters) of a fifty percent concentrated hydrochloric acid solution (made by mixing 62.5 ml. of concentrated hydrochloric acid with 62.5 ml. of water). During the addition, the temperature rose from room temperature to about 70° C. At this point, 32.5 grams (0.252 gram mole) of dimethyldichlorosilane was added drop-wise with stirring over a one-half hour period. During the addition, the reaction temperature was maintained between 70 and 80° C. Stirring was continued for one-half hour after the addition was completed. The liquid was then decanted from the polymeric product which was washed with water until the washings were neutral. The polymeric product was then washed with acetone and dried in vacuo.

As stated previously, a wide variety of acids may be employed in our process providing they have an ionization constant, pKa, in excess of $1.1 \times 10^{-2}$. A further requirement for the acid is that it be a relatively non-oxidizing acid which excludes such acids as nitric acid, perchloric acid and the like. To illustrate the wide variety of acids and acid conditions which may be employed in our process, there is presented the following Table I which shows a number of reactions that were carried out using the same conditions as in Example V.

In the first column of the table is shown the quantity of sodium orthosilicate undecahydrate reactant in gram moles. In the second column is shown the quantity of dimethyldichlorosilane reactant expressed in gram moles. In the third column is shown the acid employed, the amount of acid employed, and the concentration of the acid employed.

TABLE I

| Gram Moles of $Na_4SiO_4.11 H_2O$ | Gram Moles of $(CH_3)_2SiCl_2$ | Amount of Acid (cc.) and Acid Concentration |
| --- | --- | --- |
| 0.0458 | 0.126 | 62.5 cc. of 98% $H_2SO_4$ |
| 0.0916 | 0.252 | 130 cc. of 60% $H_2SO_4$ |
| 0.0916 | 0.252 | 125 cc. of 50% $Cl_3CCOOH$ |
| 0.0458 | 0.126 | 62.5 cc. of 70% $Cl_3CCOOH$ |
| 0.0458 | 0.126 | 62.5 cc. of 100% $Cl_3CCOOH$ |

Polymeric products having good properties—malleable and relatively non-tacky—were obtained from each of the reactions described in Table I.

As stated previously, the mole ratio of the silane reactant to the silicate reactant can be varied from about 15:1 to about 1:1. By varying the reactant ratios, a wide range of products is obtained with properties varied from a tacky soft rubber to a stiff plastic mass. This is illustrated by the following example and table.

*Example VI*

Fourteen grams (0.038 gram mole) of sodium orthosilicate decahydrate was added incrementally to a mixture of 12.9 grams (0.1 gram mole) of dimethyldichlorosilane and 100 cc. of concentrated hydrochloric acid. Addition took place with stirring over about a one-half hour period with the mixture being maintained at between about 70 to about 80° C. The liquid was then decanted from the polymeric product which was washed with water until the washings were neutral, after which the polymeric product was dried in vacuo. The mole ratio of reactants employed in this example was about 2.5 moles of dimethyldichlorosilane for each mole of sodium orthosilicate decahydrate. The product obtained was a plastic gum having superior properties in that the gum was malleable and non-tacky.

In the following Table II are shown the results obtained by repeating Example VI using varying mole ratios of the dimethyldichlorosilane reactant with respect to the sodium orthosilicate decahydrate reactant. In the first and second columns of the table are shown the number of grams and (gram moles) of the dimethyldichlorosilane and sodium orthosilicate decahydrate reactants employed. In the third column of the table is shown the mole ratio of the dimethyldichlorosilane reactant to the sodium orthosilicate decahydrate reactant. In the fourth column of the table is shown the properties of the polymeric product which were obtained.

TABLE II

| Grams and (Gram Moles) of Reactants | | Mole Ratio $(CH_3)_2SiCl_2/$ $Na_4SiO_4.10 H_2O$ | Properties of Polymeric Product |
| --- | --- | --- | --- |
| $(CH_3)_2SiCl_2$ | $Na_4SiO_4.$ $10 H_2O$ | | |
| 12.9 (0.1) | 7.0 (0.019) | 5/1 | Sticky soft gum. |
| 12.9 (0.1) | 3.5 (0.009) | 10/1 | Viscous liquid. |
| 12.9 (0.1) | 35.0 (0.09) | 1.1/1 | Stiff plastic. |

As shown by the above table, the properties of our polymeric products can be varied widely by varying the reactant ratios employed. Thus, by varying the reactant ratios, we can produce a wide range of products ranging from viscous oils to stiff plastic materials.

In another aspect of our invention, it was found that we could obtain useful polymeric materials by using a mixed silane reactant including the silane reactant $RR'SiX_2$, as previously defined, in admixture with other silane materials. The mixed silane reactant was reacted with an alkali metal silicate as defined previously. Thus, we reacted mixtures of dimethyldichlorosilane with up to ten mole percent of an alkenylalkyldihalosilane such as vinylmethyldichlorosilane with sodium orthosilicate decahydrate to give polymers of increased molecular weight as compared with polymers from reaction of dimethyldichlorosilane with sodium orthosilicate. Also, we reacted mixtures of dimethyldichlorosilane including up to ten mole percent of an alkyltrihalosilane such as methyltrichlorosilane with sodium orthosilicate decahydrate. This reaction gave higher molecular weight polymers which had, however, generally the same properties as polymers obtained from reaction of dimethyldichlorosilane with sodium orthosilicate.

Still another example of mixed silanes which we employed as reactants were mixtures of dimethyldichlorosilane with up to twenty mole percent of an arylalkyldihalosilane such as phenylmethyldichlorosilane. Such mixtures were reacted with sodium orthosilicate to give useful polymers.

Our products can be cured in a conventional manner through the use of a standard peroxide curing catalyst. Typical of such peroxide catalysts are benzoyl peroxide, and chlorobenzoyl peroxide. Also, as illustrated by the previous examples, our polymeric products can be cured by subjecting them to gamma irradiation. A further means of curing our polymeric products is with the use of a curing catalyst such as dibutyl tin dilaurate.

Since, as pointed out previously, our polymeric products have hydrocarbon side groups as well as hydroxyl side groups, they are very versatile products. To illustrate, curing catalysts such as dibutyl tin dilaurate tend to cure polymers by removing active hydrogens. In the case of our polymeric products, this curing mechanism tends to remove hydrogens from the hydroxyl side groups and thereby form siloxane crosslinks between silicon atoms. Peroxide curing catalysts and also gamma irradiation tend to produce cross-linking by removing hydrogen atoms from hydrocarbon side groups. As applied to our polymeric products, this curing mechanism tends to produce alkyl, aryl, alkaryl, and aralkyl cross-links between silicon atoms. Since either of several cross-linking mechanisms can be employed in curing our polymeric products, a wide range of cured polymers can be obtained by employing mixtures of curing catalysts in which individual catalysts in the mixture tend to produce cross-linking by different mechanisms. Thus, for example, by employing a catalyst mixture of dibutyl tin dilaurate with a peroxide such as benzoyl peroxide, the ratio of siloxane cross-linking to hydrocarbon chain cross-linking can be varied to produce a whole range of cured polymeric products.

When curing our polymeric products, conventional fillers such as ferric oxide, titanium oxide, zirconium oxide, asbestos filler, silica fillers, and fuller's earth can be employed. Also, plasticizers such as low molecular weight silicone oils, diethyl phthalate, dibutyl phthalate, dioctyl phthalate; dimer acid which is a dimer of oleic acid; and the adipates such as 2-ethylhexyl adipate, 2,2,3-trimethylpentyl adipate, and dioctyl adipate can be incorporated into our polymeric materials prior to curing.

The silicate polymers of this invention may be employed as elastomeric ablative materials. In this use, they act as a heat sink by using heat to vaporize the ablative material. Typical of such use is a coating for a nose cone or other object which is subjected to high heat fluxes. A particular polymer which works well for this utility is the rubbery product obtained by curing the polymeric product of Example I.

In another form of our invention, a silicate compound $M_ySiO_z$, as defined previously, is reacted with a silane RR'Si(OT)$_2$ or RR'Si(OT)X in which M, y, z, R, R', and X have the meaning set forth previously. T is a lower alkyl radical, i.e., one containing from one to about ten carbon atoms, such as methyl, ethyl, propyl, pentyl, heptyl, or decyl. The reaction conditions employed are those set forth previously with regard to reaction of a metal silicate, $M_ySiO_z$, and a silane, RR'SiX$_2$, to give a silicate polymer. By employing RR'Si(OT)$_2$ or RR'Si(OT)X as a reactant, there are obtained silicate polymers which have good high temperature properties.

Having fully defined our novel process and the compounds made thereby, we desire to be limited only within the lawful scope of the appended claims.

What is claimed is:

1. A process for preparing polymeric silicate compositions comprising: reacting an alkali metal silicate compound having the formula $M_ySiO_z$ with a silane having the formula RR'SiX$_2$ in which M is an alkali metal, R and R' each contain from one to about ten carbon atoms and are selected from the group consisting of lower alkyl radicals, lower alkaryl radicals, lower aralkyl radicals, and lower aryl radicals, X is a halogen selected from the group consisting of chlorine, bromine and iodine, y is an even whole number of from two to four, z is a whole number ranging from three to four with z being at least as large as y, with the mole ratio of said silane reactant to said silicate reactant ranging from about 15 to 1 to about 1 to 1, said reaction being carried out with agitation in the presence of a relatively non-oxidizing acid having an ionization constant in excess of $1.1 \times 10^{-2}$ and water.

2. The process of claim 1 wherein said silicate reactant is hydrated and said water required for the reaction is derived from the water of hydration of said silicate reactant.

3. The process of claim 1 wherein M is sodium.

4. The process of claim 1 wherein said acid is hydrochloric acid.

5. The process of claim 1 wherein R and R' are methyl groups.

6. The process of claim 1 wherein X is chlorine.

7. The process of claim 1 wherein the reaction temperature is maintained between about 70 to about 90° C.

8. The process of claim 1 including the additional step of curing the polymeric silicate product.

9. A process for preparing polymeric silicate compositions comprising: reacting a sodium silicate compound having the formula Na$_y$SiO$_z$ with a silane having the formula RR'SiX$_2$ in which R and R' each contain from one to about ten carbon atoms and are selected from the group consisting of lower alkyl radicals, lower alkaryl radicals, lower aralkyl radicals, and lower aryl radicals, X is a halogen selected from the group consisting of chlorine, bromine and iodine, y is an even whole number of from two to four, z is a whole number ranging from 3 to 4, with z being at least as large as y, with the mole ratio of said silane reactant to said silicate reactant ranging from about 15 to 1 to about 1 to 1, said reaction being carried out with agitation in the presence of a relatively non-oxidizing acid having an ionization constant in excess of $1.1 \times 10^{-2}$ and water.

10. The process of claim 9 wherein the sodium silicate reactant is sodium orthosilicate.

11. The process of claim 9 wherein the sodium silicate reactant is sodium metasilicate.

12. The process of claim 9 wherein X is chlorine.

13. The process of claim 9 wherein said silane reactant is dimethyldichlorosilane.

14. The silicate polymer prepared by reacting an alkali metal silicate compound having the formula $M_ySiO_z$ with a silane having the formula RR'SiX$_2$ in which M is an alkali metal, R and R' each contain from one to about ten carbon atoms and are selected from the group consisting of lower alkyl radicals, lower alkaryl radicals, lower aralkyl radicals, and lower aryl radicals, X is a halogen selected from the group consisting of chlorine, bromine and iodine, y is an even whole number of from two to four, z is a whole number ranging from 3 to 4 with z being at least as large as y, with the mole ratio of said silane reactant to said silicate reactant ranging from about 15 to 1 to about 1 to 1, said reaction being carried out with agitation in the presence of a relatively non-oxidizing acid having an ionization constant in excess of $1.1 \times 10^{-2}$ and water.

15. A cured polymeric silicate composition formed by reacting an alkali metal silicate compound having the formula $M_ySiO_z$ with a silane having the formula RR'SiX$_2$ in which M is an alkali metal, R and R' each contain from one to about ten carbon atoms and are selected from the group consisting of lower alkyl radicals, lower alkaryl radicals, lower aralkyl radicals, and lower aryl radicals, X is a halogen selected from the group consisting of chlorine, bromine and iodine, y is an even whole number of from two to four, z is a whole number ranging from 3 to 4 with z being at least as large as y, with the mole ratio of said silane reactant to said silicate reactant ranging from about 15 to 1 to about 1 to 1, said reaction being carried out with agitation in the presence of a relatively non-oxidizing acid having an ionization constant in excess of $1.1 \times 10^{-2}$ and water to form a polymeric product, and curing said polymeric product.

16. The composition of claim 14 wherein said alkali metal silicate is selected from the group consisting of sodium orthosilicate and sodium metasilicate.

17. The product of claim 16 wherein said silane is dimethyldichlorosilane.

18. The product of claim 17 wherein about two and one-half moles of dimethyldichlorosilane are employed for each mole of alkali metal silicate reactant selected from the group consisting of sodium orthosilicate and sodium metasilicate.

19. The product of claim 18 wherein said acid is hydrochloric acid.

20. The product of claim 16 wherein said silane is methylphenyldichlorosilane.

References Cited by the Examiner

UNITED STATES PATENTS

| | | | |
|---|---|---|---|
| 2,587,636 | 3/1952 | MacMullen | 260—46.5 |
| 2,698,314 | 12/1954 | Rust | 260—46.5 |
| 2,802,850 | 8/1957 | Wetzel | 260—2 |

OTHER REFERENCES

Rochow, Chemistry of the Silicones, 1951, page 71, Wiley and Sons, Inc., New York.

LEON J. BERCOVITZ, *Primary Examiner.*

WILLIAM H. SHORT, MELVYN I. MARQUIS,
*Assistant Examiners.*